(12) United States Patent
Sadasivam et al.

(10) Patent No.: US 11,017,305 B2
(45) Date of Patent: May 25, 2021

(54) SYSTEM FOR ALERTING A USER BEFORE A BREAKDOWN OF A COMPONENT PRESENT IN A VEHICLE

(71) Applicant: HCL TECHNOLOGIES LIMITED, Noida (IN)

(72) Inventors: Siva Sakthivel Sadasivam, Chennai (IN); Vishal Chaudhary, Sunnyvale, CA (US)

(73) Assignee: HCL TECHNOLOGIES LIMITED, Noida (IN)

(*) Notice: Subject to any disclaimer, the term of this patent is extended or adjusted under 35 U.S.C. 154(b) by 101 days.

(21) Appl. No.: 16/010,876

(22) Filed: Jun. 18, 2018

(65) Prior Publication Data

US 2019/0005394 A1 Jan. 3, 2019

(30) Foreign Application Priority Data

Jun. 29, 2017 (IN) .............................. 201711022848

(51) Int. Cl.
| | |
|---|---|
| *G06N 5/04* | (2006.01) |
| *G07C 5/00* | (2006.01) |
| *G07C 5/08* | (2006.01) |
| *G06N 20/00* | (2019.01) |

(52) U.S. Cl.
CPC .............. *G06N 5/04* (2013.01); *G07C 5/006* (2013.01); *G07C 5/085* (2013.01); *G07C 5/0816* (2013.01); *G06N 20/00* (2019.01); *G07C 5/008* (2013.01)

(58) Field of Classification Search
CPC ........ G06N 5/04; G06N 20/00; G07C 5/0816; G07C 5/006; G07C 5/008

USPC ........................................................ 701/31.9
See application file for complete search history.

(56) References Cited

U.S. PATENT DOCUMENTS

| | | | |
|---|---|---|---|
| 6,741,938 B2* | 5/2004 | Berndorfer | ............ F01M 11/10 |
| | | | 701/29.5 |
| 8,433,672 B2 | 4/2013 | Shin et al. | |
| 8,504,225 B2 | 8/2013 | Bieker et al. | |
| 10,599,155 B1* | 3/2020 | Konrardy | ........... B60W 60/0011 |
| 2006/0217935 A1 | 9/2006 | Beiermeister et al. | |

(Continued)

OTHER PUBLICATIONS

Shin et al., "On condition based maintenance policy," Journal of Computational Design and Engineering, vol. 2, Issue 2, Apr. 2015, pp. 119-127.

*Primary Examiner* — Jonathan M Dager
*Assistant Examiner* — Jean W Charleston
(74) *Attorney, Agent, or Firm* — Patent Portfolio Builders PLLC

(57) ABSTRACT

Disclosed is a system for alerting a user before a breakdown of a component present in a vehicle. In order to alert the user, initially, the system determines a status of a vehicle based on one or more sensors being deployed in the vehicle. Upon determining the status, the system computes component usage data, pertaining to a component, and residual life of the component. The component usage data may be computed based on the status of the vehicle and metadata associated to the status. The residual life of the component, on the other hand, may be computed based on reliability data associated to each component and the component usage data. Upon computation of the component usage data and the residual life, the system generates an alert to indicate a user regarding a breakdown of the component when the residual life is less than a predefined threshold life.

6 Claims, 4 Drawing Sheets

(56) References Cited

U.S. PATENT DOCUMENTS

| | | | |
|---|---|---|---|
| 2007/0179706 A1* | 8/2007 | McCutchen | G06Q 10/00 701/533 |
| 2010/0217478 A1 | 8/2010 | Zhang et al. | |
| 2010/0270097 A1* | 10/2010 | Prakash | B60K 6/12 180/165 |
| 2015/0228129 A1* | 8/2015 | Cox | G01S 19/13 701/29.1 |
| 2016/0023659 A1* | 1/2016 | Tanaka | B60W 20/15 701/22 |
| 2016/0039292 A1* | 2/2016 | Takahashi | B60W 30/18109 701/70 |
| 2017/0365109 A1* | 12/2017 | Tseng | G07C 5/006 |
| 2018/0114383 A1* | 4/2018 | Boss | G07C 5/008 |
| 2019/0047493 A1* | 2/2019 | Chierichetti | B60R 16/0234 |
| 2019/0156266 A1* | 5/2019 | Hubbard | G06Q 10/06398 |
| 2019/0202477 A1* | 7/2019 | Kapuria | G06K 9/00832 |

* cited by examiner

SYSTEM FOR ALERTING A USER BEFORE A BREAKDOWN OF A COMPONENT PRESENT IN A VEHICLE

CROSS REFERENCE TO RELATED APPLICATIONS

This present application claims benefit from Indian Complete Patent Application No 201711022848 filed on 29 Jun. 2017, the entirety of which is hereby incorporated by reference.

TECHNICAL FIELD

The present subject matter described herein in general relates to alert a user, before a breakdown of a component present in a vehicle, and optimize replacement of the component(s) based on time.

BACKGROUND

Currently a due date for vehicle's maintenance is determined based on distance travelled and time passed since the last service of the vehicle. For example, next periodic service of the vehicle may be determined as 10,000 kilometers or 6 months, whichever is earlier, post the last service. During such service in a periodic manner, some of the components (either mechanical or electronic/electrical) deployed in the vehicle may get replaced based on the distance travelled or the time passed, like engine oil is changed every 6 months, Brakes are replaced after 20,000 kilometers. In addition to the above, the services stations do not consider whether the vehicle is driven on a rough or a smooth road and keep maintenance charges same for both the rash driver and the conventional driver. Thus, at present, the service stations do not emphasize on wear and tear of the components and merely replace the same irrespective of whether a component actually needs replacement.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for alerting a user before a breakdown of a component present in a vehicle and the concepts are further described below in the detailed description. This summary is not intended to identify essential features of the claimed subject matter nor is it intended for use in limiting the scope of the claimed subject matter.

In one implementation, a system for alerting a user before a breakdown of a component present in a vehicle is disclosed. The system may comprise a processor and a memory coupled to the processor. The processor may execute a plurality of modules present in the memory. The plurality of modules may comprise a status determination module, a computation module, and an alert generation module. The status determination module may determine a status of a vehicle based on one or more sensors being deployed in the vehicle. The computation module may compute component usage data, pertaining to a component, based on the status of the vehicle and metadata associated to the status. The computation module may further compute residual life of the component based on reliability data associated to each component and the component usage data. In one aspect, the reliability data indicates a total life span of the component. The alert generation module may generate an alert to indicate the user regarding the breakdown of the component when the residual life is less than a predefined threshold life thereby alerting the user before the breakdown of the component present in the vehicle.

In another implementation, a method for alerting a user before a breakdown of a component present in a vehicle is disclosed. In order to alert the user, initially, a status of a vehicle may be determined based on one or more sensors being deployed in the vehicle. Upon determining the status, component usage data, pertaining to a component, and residual life of the component may be computed. The component usage data may be computed based on the status of the vehicle and metadata associated to the status. The residual life of the component, on the other hand, may be computed based on reliability data associated to each component and the component usage data. In one aspect, the reliability data indicates a total life span of the component. Upon computation of the component usage data and the residual life, an alert may be generated to indicate a user regarding a breakdown of the component when the residual life is less than a predefined threshold life thereby alerting the user before the breakdown of the component present in the vehicle. In one aspect, the aforementioned method for alerting the user before the breakdown of the component present in the vehicle may be performed by a processor using programmed instructions stored in a memory.

In yet another implementation, non-transitory computer readable medium embodying a program executable in a computing device for alerting a user before a breakdown of a component present in a vehicle is disclosed. The program may comprise a program code for determining a status of a vehicle based on one or more sensors being deployed in the vehicle. The program may comprise a program code for computing component usage data, pertaining to a component, based on the status of the vehicle and metadata associated to the status and residual life of the component based on reliability data associated to each component and the component usage data, wherein the reliability data indicates a total life span of the component. The program may comprise a program code for generating an alert to indicate a user regarding a breakdown of the component when the residual life is less than a predefined threshold life thereby alerting the user before the breakdown of the component present in the vehicle.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
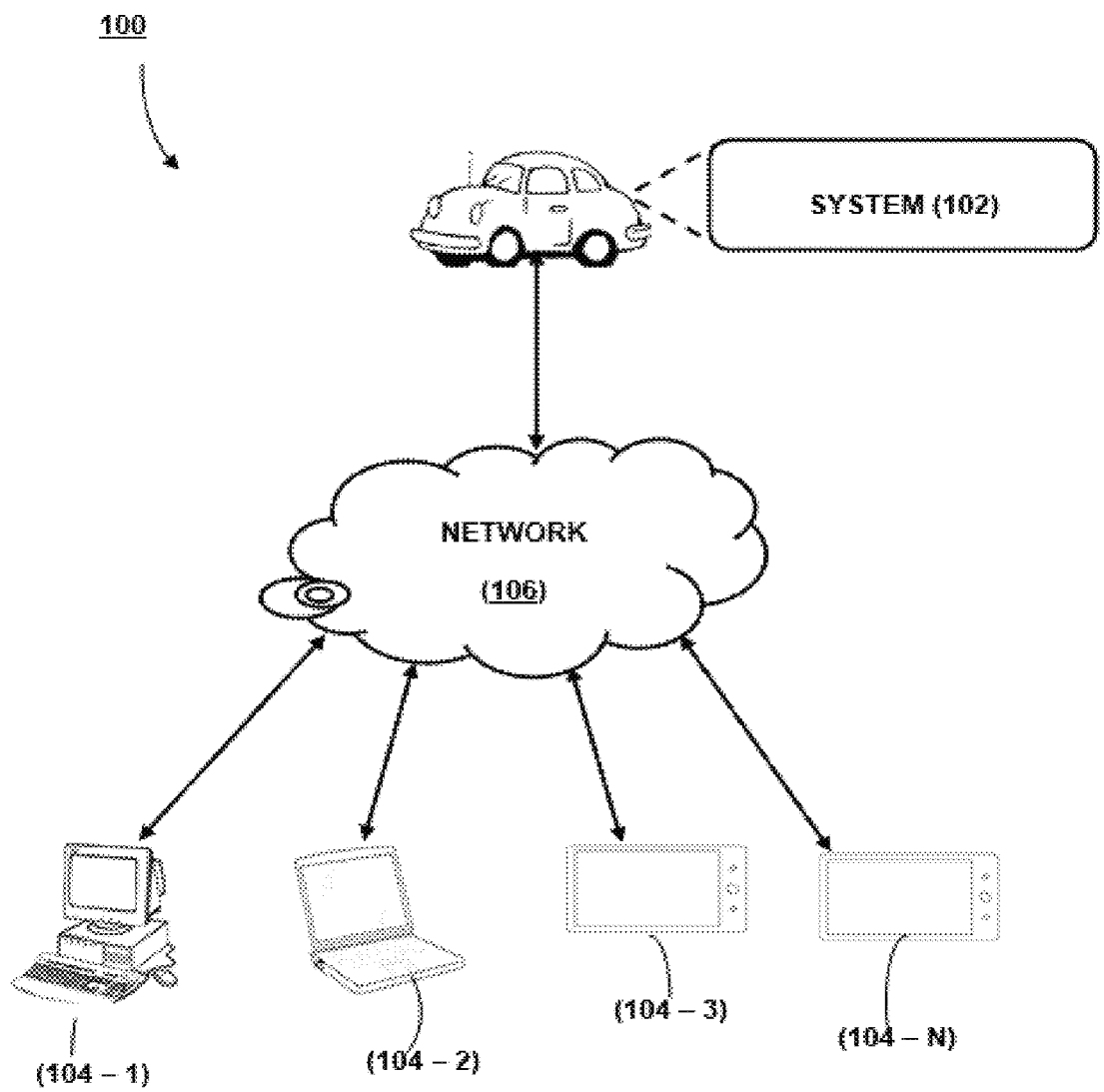
FIG. 1 illustrates a network implementation of a system for alerting a user before a breakdown of a component present in a vehicle, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention facilitates to alert a user before a breakdown of a component present in a vehicle is disclosed. It may be noted that the user may be an owner or a service engineer responsible for servicing the vehicle. In order to alert the user, the present invention comprises two components. First component is to identify a current status of the vehicle. The status of the vehicle may be one of running, running on a ramp, braking, braking on a ramp upward, taking a turn on right side, taking a turn on left side, idling, reverse, parked, running at wrong gear, and running with clutch. The current status of the vehicle may be determined based on data captured from one or more sensors being deployed in the vehicle. It may be noted that an output of the first component may be stored in a non-volatile memory, hereinafter may referred to as a database, for usage in runtime or in offline.

Second component, on the other hand, is to map the status of the vehicle with various components used during when the vehicle in a specific status. Since reliability data pertaining to each component may be recommended by a manufacturer of the component, residual life of the component may be determined and advised during service of the vehicle. In other words, each component in the vehicle is getting tested for its reliability from the manufacturer, this reliability data may get translated to the current status or number of times used or per km travelled. With this computation, an expected usage of the component may be determined and stored in the database. With the continuous usage of the component, the residual life of the component keeps on reducing. Once the residual life reaches a threshold value, an alert message may be triggered to alert the user before the breakdown of the component. Thus, in this manner, the user may be alerted before the breakdown of the component present in the vehicle.

While aspects of described system and method for alerting the user before the breakdown of the component present in the vehicle may be implemented in any number of different computing systems, environments, and/or configurations, the embodiments are described in the context of the following exemplary system.

Referring now to FIG. 1, a network implementation 100 of a system 102 system for alerting a user before a breakdown of a component present in a vehicle is disclosed. In order to alert the user, initially, the system 102 determines a status of a vehicle based on one or more sensors being deployed in the vehicle. Upon determining the status, the system 102 computes component usage data, pertaining to a component, and residual life of the component. The component usage data may be computed based on the status of the vehicle and metadata associated to the status. The residual life of the component, on the other hand, may be computed based on reliability data associated to each component and the component usage data. In one aspect, the reliability data indicates a total life span of the component. Upon computation of the component usage data and the residual life, the system 102 generates an alert to indicate a user regarding a breakdown of the component when the residual life is less than a predefined threshold life thereby alerting the user before the breakdown of the component present in the vehicle.

Although the present disclosure is explained considering that the system 102 is implemented on a vehicle, it may be understood that the system 102 may also be implemented in a variety of computing systems, such as a server, a laptop computer, a desktop computer, a notebook, a workstation, a mainframe computer, a server, a network server, a cloud-based computing environment. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
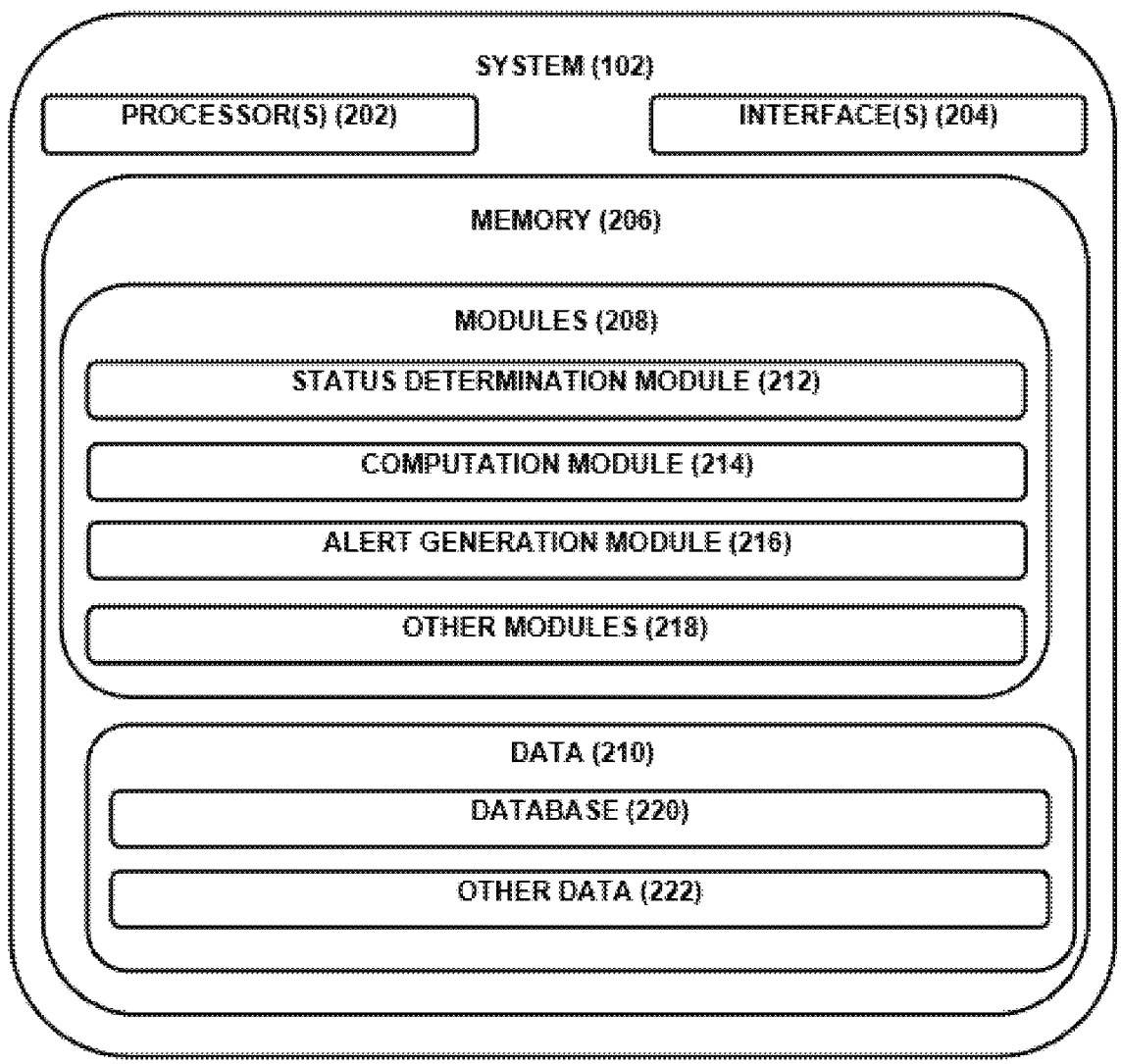
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a status determination module 212, a computation module 214, an alert generation module 216, and other modules 218. The other modules 218 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a database 220 and other data 222. The other data 222 may include data generated as a result of the execution of one or more modules in the other modules 222.

As there are various challenges observed in the existing art, the challenges necessitate the need to build the system 102 for alerting a user before a breakdown of a component present in a vehicle. In order to alert the user, at first, a user may use the user device 104 to access the system 102 via the I/O interface 204. The user may register them using the I/O interface 204 to use the system 102. In one aspect, the user may access the I/O interface 204 of the system 102. To alert the user, the system 102 may employ the status determination module 212, the computation module 214, and the alert generation module 216. The detail functioning of the modules is described below with the help of figures.

The status determination module 212 determines a status of a vehicle based on one or more sensors being deployed in the vehicle. The one or more sensors may include, but not limited to, an accelerometer, a gyro metric sensor, a compass, a temperature sensor, a Pressure sensor, a Global Positioning System (GPS). The status is one of running, running on a ramp, braking, braking on a ramp upward, taking a turn on right side, taking a turn on left side, idle, reverse, parked, running at wrong gear, running with clutch, running on bouncy road. It may be understood that to determine the status, it becomes necessary to train the system 102 with distinct data patterns when the vehicle transits from one status to another. Therefore, the system 102 is trained for each status along with their corresponding data patterns. It may be noted that the training of the system 102 is one-time task and may be updated whenever any new status needs to be appended in a list of the status as aforementioned.

In order to train the system 102, the status determination module 212 captures data corresponding to each status. In one aspect, the data may be captured by using the one or more sensors. Upon capturing the data, the status determination module 212 stores a set of training patterns corresponding to each status in the database 220. In other words, each training pattern indicates a set of values, associated to the one or more sensors, captured during a presence of the vehicle in at least one status.

For example, in order to train the system 102, the vehicle may be placed in at least one status such as the 'running condition'. While the vehicle is in the 'running condition', data pattern may be captured from all the sensors that are in operation during the 'running condition' of the vehicle. The data pattern is then stored the database 220 against the status i.e. the 'running condition'. Similarly, data patterns for other statuses may be captured and stored in the database 220 for future reference.

Once the system 102 is trained and all the statuses are stored, during live condition, the status determination module 212 captures the data from the one or more sensors while the vehicle is present in the at least one status. Upon capturing the data, the status determination module 212 compares a real-time pattern with the set of data patterns, as stored in the database 220. The real-time pattern is compared with the set of data patterns to determine at least one training pattern amongst the set of training patterns. This at least one training pattern indicates the status of the vehicle. Thus, in this manner, the system 102 may be trained and referred to determine the status of the vehicle.

Upon determining the status of the vehicle, the computation module 214 computes component usage data, pertaining to the component, and residual life of the component. The component usage data may be determined based on the status of the vehicle and metadata associated to the status. The metadata indicates usage of the component during the status of the vehicle as determined by the status determination module 212. In one aspect, the metadata is one of number of times brake applied, number of times clutch presses, number of times gear changed, number of kilometers tyre ran, and like. With this computation, expected usage of the component may be determined and stored in the database 220.

In order to compute the component usage data, the computation module 214 refers a predefined mapping between the status and the component in order to identify the component usage pertaining to a specific component. In one example, the predefined mapping between the status with the component is illustrated in the below table 1. The table 1 indicates a percentage of wear and tear of the component varies with the status of the vehicle.

| | Parking per unit time | engine idle | Running | Braking | Up hill | Down hill |
|---|---|---|---|---|---|---|
| Tyre | 0.0000010% | 0.0000010% | 0.0000010% | 0.0000020% | 0.0000010% | 0.0000010% |
| Brake pads | | | | 0.0001000% | 0.0001000% | 0.0001000% |
| Ignition coil | | 0.0000010% | 0.0000010% | 0.0000010% | 0.0000020% | 0.0000010% |
| Wheel | 0.0000010% | | 0.0000020% | 0.0000010% | 0.0000010% | 0.0000010% |
| Shock absorbers | | | 0.0000010% | 0.0000010% | 0.0001000% | 0.0001000% |
| Wiper blades | | | | | | |
| Engine Oil | | 0.0000010% | 0.0000020% | 0.0000010% | 0.0000010% | 0.0000010% |
| Air filter | | 0.0000010% | 0.0000010% | 0.0000010% | 0.0000010% | 0.0000010% |
| Vehicle Chassis | 0.0000010% | 0.0000010% | 0.0000010% | 0.0000010% | 0.0000020% | 0.0000010% |
| Steering wheel assembly | | | 0.0000010% | 0.0000010% | 0.0000010% | 0.0000010% |
| Gear shift | | | 0.0000010% | 0.0000010% | 0.0000010% | 0.0000010% |

From the above table 1, it may be noted that 'Parking', 'engine idle', 'Running, 'Braking', 'Uphill', and 'Downhill' are the statuses of the vehicle whereas 'Tyre', 'Brake pads', 'Ignition coil', 'Wheel', 'Shock absorbers', 'Wiper blades', 'Engine Oil', 'Air filter', 'Vehicle Chassis', 'Steering wheel assembly', and 'Gear shift' are the components of the vehicle. The values mentioned in percentage(s) indicates the component usage data. For example, every time the 'vehicle is parked' (per unit time), 0.0000010% of the 'Tyre' may be used. Similarly, every time the 'brake is applied' on the vehicle is applied, 0.0000020% of the 'brakes' may be used. Thus, in this manner, the computation module 214 computes the component usage data.

Subsequent to the computation of the component usage data, the computation module 214 computes residual life of the component. In one aspect, the residual life may be computed based on reliability data associated to each component and the component usage data. The reliability data indicates a total life span of the component. It may be noted that the reliability data pertaining to each component may be provided by the manufacturer of the component. In one aspect, the residual life of the component may be computed upon subtracting the component usage data from the reliability data.

In order to elucidate the aforementioned functioning, consider an example, where a 'Tyre' (i.e. component) may run for 1,00,000 kilometers which indicates that the 'Tyre' has the reliability data as 1,00,000 kilometers. Then, based on the Table 1, it may be noted that for 'normal running' (as the status of the vehicle), 0.0000010% (i.e. component's usage data) of Tire's residual life may be depreciated. In other words, for every Kilometer of 'normal running', the residual life of the 'Tyre' is reduced by $1/100000$. It may be noted that the residual life of the component keeps on reducing variably based on the status and the component usage data.

Upon computing the residual life, the alert generation module 216 generates an alert to indicate the user regarding the breakdown of the component. In one aspect, the alert generation module 216 generates the alert when the residual life is less than a predefined threshold life. Thus, in this manner, the system 102 alerts the user before the breakdown of the component present in the vehicle.

Figure 3:
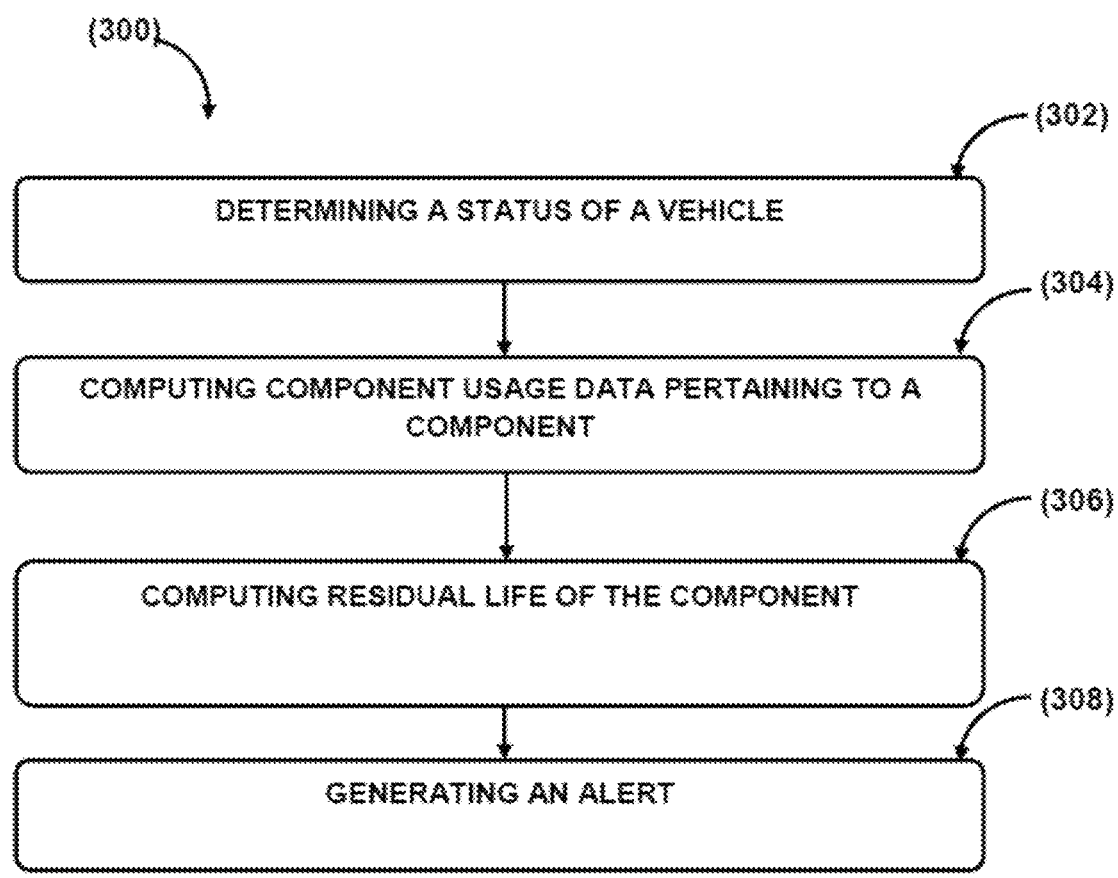
FIGS. 3 and 4 illustrate a method for alerting the user before the breakdown of the component, in accordance with an embodiment of the present subject matter.

Referring now to FIG. 3, a method 300 for alerting a user before a breakdown of a component present in a vehicle is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the system 102.

At block 302, a status of a vehicle may be determined based on one or more sensors being deployed in the vehicle. In one implementation, the status of the vehicle may be determined by the status determination module 212.

At block 304, component usage data, pertaining to a component, may be computed based on the status of the vehicle and metadata associated to the status. In one implementation, the component usage data may be computed by the computation module 214.

At block 306, residual life of the component may be computed based on reliability data associated to each component and the component usage data. In one aspect, the reliability data indicates a total life span of the component. In one implementation, the residual life of the component may be computed by the computation module 214.

At block 308, an alert may be generated to indicate a user regarding a breakdown of the component when the residual life is less than a predefined threshold life thereby alerting the user before the breakdown of the component present in the vehicle. In one implementation, the alert may be generated by the alert generation module 216.

Figure 4:
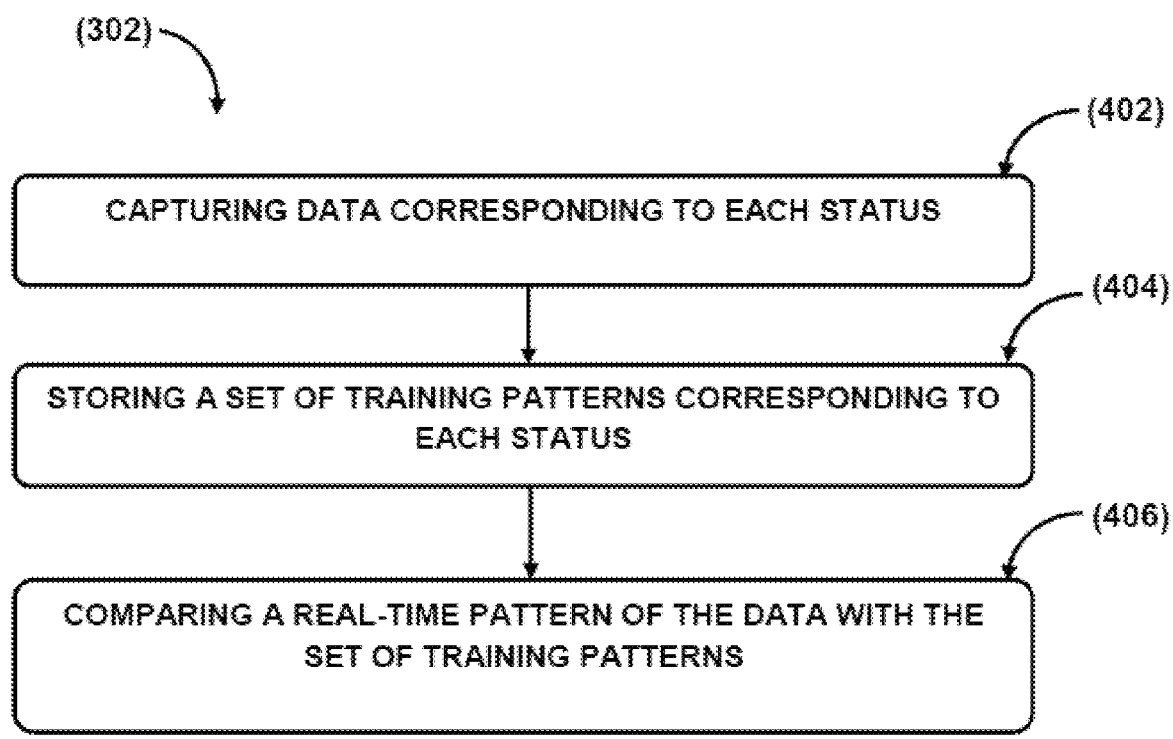

Referring now to FIG. 4, a method 302 for determining the status of the vehicle is shown, in accordance with an embodiment of the present subject matter.

At block 402, data corresponding to each status may be captured. In one aspect, the data may be captured by using the one or more sensors. In one implementation, the may be captured by the status determination module 212.

At block 404, a set of training patterns may be stored corresponding to each status in the database 220. In one implementation, the set of training patterns may be stored by the status determination module 212.

At block 406, a real-time pattern of the data may be compared with the set of training patterns to determine at least one training pattern amongst the set of training patterns. In one aspect, the at least one training pattern indicates the status of the vehicle. In one aspect, the real-time pattern may be determined upon capturing data from the one or more sensors while the vehicle is in at least one status. In one implementation, the real-time pattern of the data may be compared by the status determination module 212.

Exemplary embodiments discussed above may provide certain advantages. Though not required to practice aspects of the disclosure, these advantages may include those provided by the following features.

Some embodiments enable a system and a method to provide a maintenance indication in order to optimize according to the usage of the components.

Some embodiments enable a system and a method to provide a differentiation of total cost of ownership for well maintained and poorly maintained vehicle.

Some embodiments enable service people to take preventive decisions on time.

Some embodiments enable a system and a method to optimize maintenance cost for a properly maintained vehicle.

Some embodiments enable a system and a method to provide data of drivers to correct their driving pattern and guide them to choose better routes.

Although implementations for methods and systems for alerting the user before the breakdown of the component present in the vehicle have been described in language specific to structural features and/or methods, it is to be understood that the appended claims are not necessarily limited to the specific features or methods described. Rather, the specific features and methods are disclosed as examples of implementations for alerting the user.

The invention claimed is:

1. A method for alerting a user before a breakdown of a component present in a vehicle, the method comprising:
determining, a driving pattern and road conditions associated with the vehicle, wherein the driving pattern and the road conditions depend on a status of the vehicle, determined using one or more sensors deployed in the vehicle, and wherein the status is at least one of running on a ramp, braking on a ramp upward, taking a turn on right side, taking a turn on left side, idle, reverse, parked, running at a wrong gear, running with clutch, and running on a bouncy road, and wherein the status is determined by:
capturing, by a processor, data corresponding to each status, wherein the data is captured by using the one or more sensors;
storing, by the processor, a set of training patterns corresponding to each status in a database; and
comparing, by the processor, a real-time pattern of the data with the set of training patterns to determine at least one training pattern amongst the set of training patterns, wherein the at least one training pattern indicates the status of the vehicle, and wherein the real-time pattern is determined upon capturing data from the one or more sensors while the vehicle is in at least one status;
computing, by a processor,
component usage data, pertaining to a component, based on the status of the vehicle and metadata associated to the status, wherein the component usage data is computed by referring to a predefined mapping between the status and the component, and
residual life of the component based on reliability data associated to each component and the component usage data, wherein the reliability data is pre-defined by a manufacturer of the component and indicates a total life span of the component; and
generating, by the processor, an alert to indicate a user regarding a breakdown of the component when the residual life is less than a predefined threshold life thereby alerting the user before the breakdown of the component present in the vehicle.

2. The method of claim 1, wherein the one or more sensors comprise an accelerometer, a gyro metric sensor, a compass, a temperature sensor, a Pressure sensor, a Global Positioning System (GPS).

3. The method of claim 1, wherein the metadata indicates usage of the component during the status of the vehicle as determined, and wherein the metadata is one of number of times brake applied, number of times clutch presses, number of times gear changed, number of kilometers tyre ran, and like.

4. A system for alerting a user before a breakdown of a component present in a vehicle, the system comprising:
a processor; and
a memory coupled to the processor, wherein the processor is capable of executing a plurality of modules stored in the memory, and wherein the plurality of modules comprising:
a status determination module for determining a driving pattern and road conditions associated with the vehicle, wherein the driving pattern and the road conditions depend on a status of the vehicle, determined using one or more sensors deployed in the vehicle, and wherein the status is at least one of running on a ramp, braking on a ramp upward, taking a turn on right side, taking a turn on left side, idle, reverse, parked, running at a wrong gear, running with clutch, and running on a bouncy road, and wherein the status is determined by:
capturing, by the processor, data corresponding to each status, wherein the data is captured by using the one or more sensors;
storing, by the processor, a set of training patterns corresponding to each status in a database; and
comparing, by the processor, a real-time pattern of the data with the set of training patterns to determine at least one training pattern amongst the set of training patterns, wherein the at least one training pattern indicates the status of the vehicle, and wherein the real-time pattern is determined upon capturing data from the one or more sensors while the vehicle is in at least one status;
a computation module for computing
component usage data, pertaining to a component, based on the status of the vehicle and metadata associated to the status, wherein the component usage data is computed by referring to a predefined mapping between the status and the component; and
residual life of the component based on reliability data associated to each component and the component usage data, wherein the reliability data is pre-defined by a manufacturer of the component and indicates a total life span of the component; and an alert generation module for generating an alert to indicate a user regarding a breakdown of the component when the residual life is less than a predefined threshold life thereby alerting the user before the breakdown of the component present in the vehicle.

5. The system of claim 4, wherein the one or more sensors comprise an accelerometer, a gyro metric sensor, a compass, a temperature sensor, a Pressure sensor, a Global Positioning System (GPS).

6. A non-transitory computer readable medium embodying a program executable in a computing device for alerting a user before a breakdown of a component present in a vehicle, the program comprising:

a program code for determining a driving pattern and road conditions associated with the vehicle, wherein the driving pattern and the road conditions depend on a status of the vehicle, determined using one or more sensors deployed in the vehicle, and wherein the status is at least one of running on a ramp, braking on a ramp upward, taking a turn on right side, taking a turn on left side, idle, reverse, parked, running at a wrong gear, running with clutch, and running on a bouncy road, and wherein the status is determined by:

capturing, by a processor, data corresponding to each status, wherein the data is captured by using the one or more sensors;

storing, by the processor, a set of training patterns corresponding to each status in a database; and comparing, by the processor, a real-time pattern of the data with the set of training patterns to determine at least one training pattern amongst the set of training patterns, wherein the at least one training pattern indicates the status of the vehicle, and wherein the real-time pattern is determined upon capturing data from the one or more sensors while the vehicle is in at least one status;

a program code for computing:

component usage data, pertaining to a component, based on the status of the vehicle and metadata associated to the status, wherein the component usage data is computed by referring to a predefined mapping between the status and the component, and residual life of the component based on reliability data associated to each component and the component usage data, wherein the reliability data is pre-defined by a manufacturer of the component and indicates a total life span of the component; and a program code for generating an alert to indicate a user regarding a breakdown of the component when the residual life is less than a predefined threshold life thereby alerting the user before the breakdown of the component present in the vehicle.

* * * * *